UNITED STATES PATENT OFFICE.

WARREN S. WILLIAMS, OF POCATELLO, IDAHO.

COMPOSITION OF MATTER FOR USE IN THE TREATMENT OF FLOORS.

1,219,060.     Specification of Letters Patent.     Patented Mar. 13, 1917.

No Drawing.     Application filed May 3, 1916. Serial No. 95,205.

*To all whom it may concern:*

Be it known that I, WARREN S. WILLIAMS, a citizen of the United States, residing at Pocatello, in the county of Bannock and State of Idaho, have invented a new and useful Composition of Matter for Use in the Treatment of Floors, of which the following is a specification.

This invention relates to a composition of matter for use in the treatment of floors, one of the objects of the invention being to provide a composition especially useful on floors which are to be used both for the purpose of dancing and roller skating.

The invention consists of the following ingredients in the proportions stated:—

Powdered alum_____ 90 per cent.
Powdered sulfur_____ 10 per cent.

The two powders are mixed and the composition is then sprinkled over the floor, and it will be found that by the use thereof an ordinary dance floor can be used advantageously for roller skating.

What is claimed is:—

The herein described composition of matter for use in the treatment of floors, including approximately 90 per cent. of powdered alum and approximately ten per cent. of powdered sulfur.

In testimony that I claim the foregoing as my own, I have hereto affixed my signature in the presence of two witnesses.

WARREN S. WILLIAMS.

Witnesses:
   T. S. WILLIAMS,
   D. D. BURNSIDE.

Copies of this patent may be obtained for five cents each, by addressing the "Commissioner of Patents, Washington, D. C."